July 17, 1956   C. W. GRONCY   2,754,953
SHEET MATERIAL HANDLING DEVICE
Filed April 9, 1953
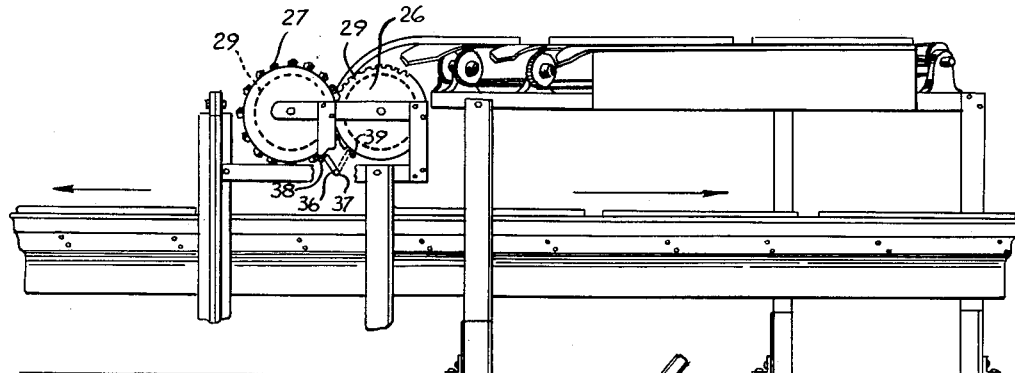
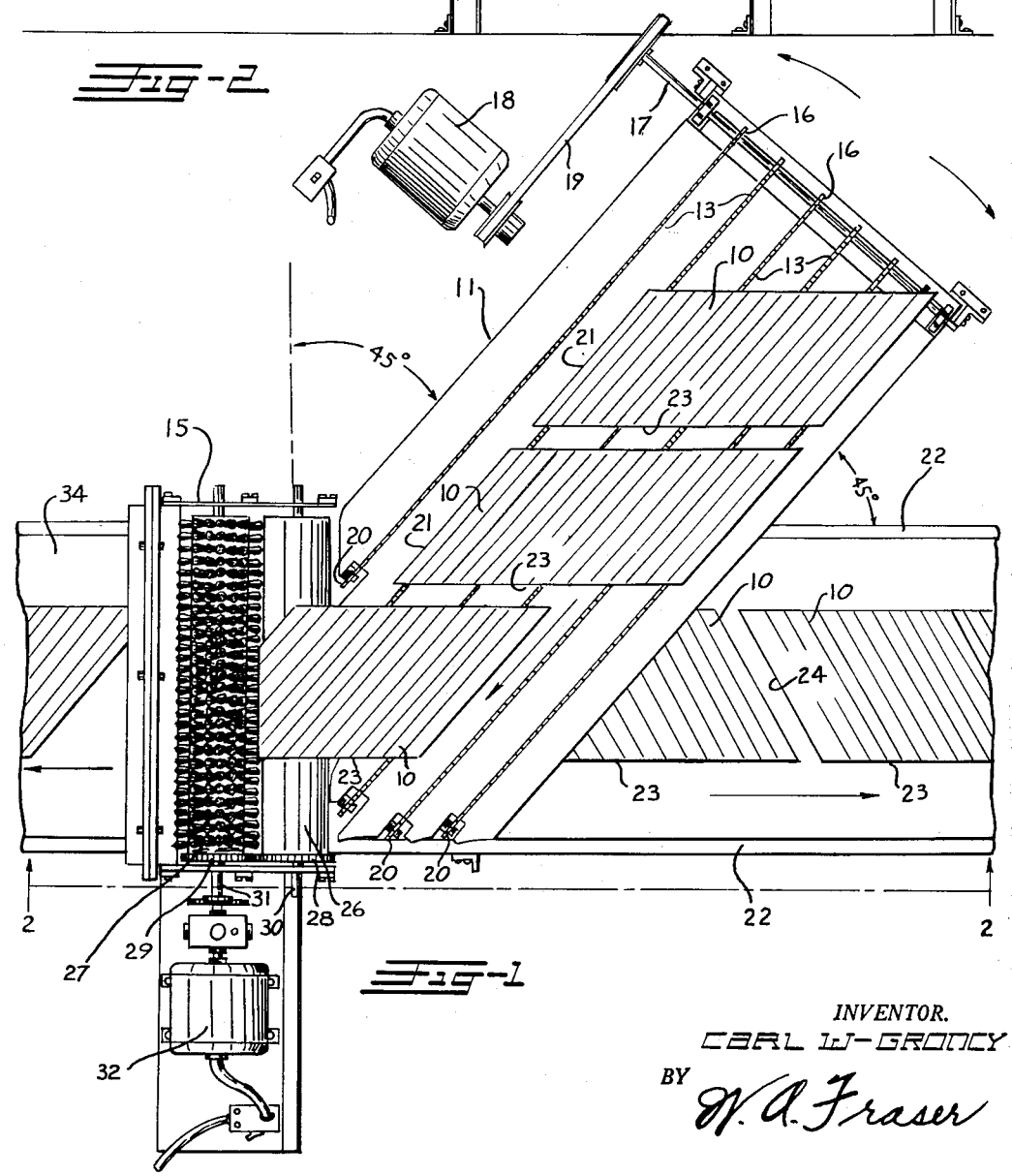
INVENTOR.
CARL W. GRONCY
BY
W. A. Fraser United States Patent Office 2,754,953
Patented July 17, 1956

2,754,953

SHEET MATERIAL HANDLING DEVICE

Carl W. Groncy, Akron, Ohio, assignor to The Firestone Tire & Rubber Company, Akron, Ohio, a corporation of Ohio Application April 9, 1953, Serial No. 347,686

14 Claims. (Cl. 198—33)

This invention relates to apparatus for handling sheet material and more particularly to apparatus adapted to turn by 90° the successive sections of tire ply stock immediately after the bias cutting operation so as to align the sections properly for the subsequent splicing operation.

The body of a pneumatic tire is built of a number of plies of rubberized, essentially weftless, fabric, the cords of which are wrapped about and anchored to the beads of the tire. In order to shape and mold the tire properly, the cords of the fabric must extend at an angle, the so-called bias angle, to the axis of the tire. To obtain fabric with the cords extending at such an angle, the rubberized fabric stock is cut by knives to produce trapezoidal sections, and the original side edges of these sections are then spliced together so that long continuous lengths of ply stock with the cords extending at the proper angle can be obtained. One of the laborious operations in the production of such ply stock is the operation in which the secions of bias-cut ply stock are turned 90° so that the sections can be spliced. At the present time, the sections of ply stock are turned by hand, but this manual operation is slow and awkward particularly where the ply stock has substantial width.

The present invention comprises apparatus for automatically performing this turning operation which comprises a pair of rolls disposed at an angle to the initial longitudinal axis of the material as it is delivered from the bias cutter to the rolls. The rolls grip the sections of ply stock and deposit them on a conveyor with their side edges in the required position for splicing. The apparatus is automatic in its operation and greatly facilitates the splicing operation which follows.

It is accordingly an object of the present invention to provide means adapted to receive trapezoidal sections of bias-cut ply stock and automatically turn them 90° into the proper position for splicing.

Another object is to provide such apparatus which is automatic in its operation and simple and effective in use.

Another object is to provide apparatus which is capable of handling a wide range of ply stock material both as to dimension and weight and bias angle.

These and other objects and advantages of the invention will become apparent from the following description of a preferred form of the invention, reference being had to the accompanying drawing in which:

Figure 1 is a plan view of apparatus embodying the invention; and

Figure 2 is an end elevation of the apparatus of Figure 1.

Referring to the drawing, apparatus embodying the invention is shown in position to handle trapezoidal sections 10 of tire ply stock immediately after they have been bias cut. In the present example, these sections are shown on a delivery table indicated generally at 11 which receives the sections from the bias cutter (not shown). The delivery table may take any one of several constructions and in the present example is shown as comprising a flat bed 12 over which conveyor chains 13 carry the sections successively to a pair of rolls indicated generally at 15, which in conjunction with the rest of the apparatus have the function of turning the sections of ply stock. The chains 13 are entrained about driving sprockets 16 mounted on a shaft 17 which is driven by a motor 18 through a belt and pulley arrangement 19. Immediately adjacent the rolls 15 the chains pass around the idler sprockets 20. It should be noted that the end of the table 11 is tapered immediately adjacent the rolls so that the rolls may be positioned close to the table and at an angle to the longtiudinal axis of the table. The conveyor chains are graduated in length accordingly.

It will be observed that the sections 10 have their cords extending longitudinally of the delivery table 11 and that the sections are spaced apart along the conveyor chains. The sections 10 rest by their own weight upon the chains 13 and are carried along by frictional contact with the chains, there being no positive engagement between the ply sections and the chains.

As a section reaches the end of the delivery table, its leading corner 21 is engaged by the rolls 15 and the section is drawn into the rolls and delivered by them to a second conveyor 22 disposed at an angle to the delivery table and located below the rolls 15, see Figure 2. It should be noted that the rolls 15 are preferably located below the plane of the bed of the delivery table in a position intermediate the delivery table and the conveyor 22. The rolls are moreover positioned at such an angle to the delivery table that the axes of the rolls are substantially perpendicular to the leading edges 23 of the ply sections. As soon as an appreciable portion of the corner 21 of a section is drawn into the rolls, the chains 13 will no longer move the section forward along the delivery table. Instead the section will be drawn positively and at considerable speed through the rolls with the section slipping on the chains as they pass beneath it.

The rolls deposit the sections on the conveyor 22 with the leading edges 23 of the sections extending parallel to the movement of the conveyor and with the former side edges 24 extending diagonally across the conveyor. The cords of the fabric which are parallel to the side edges necessarily extend laterally across the sections and across the conveyor. The sections 10 of the ply stock as they lie on the conveyor 22 are then ready for the splicing operation which can be done by conventional methods and by the use of conventional apparatus.

The relative positions of the delivery table 11, rolls 15 and conveyor 22 all bear a relation to the bias angle of the fabric. For example, if the bias angle is 45°, as indicated in Figure 1, the axis of conveyor 22 preferably lies at the same angle, 45°, to the axis of the delivery table. Likewise, the axes of the rolls also extend at an angle of 45° to the delivery table, as indicated. This relationship between the various parts of the apparatus should be maintained for each bias angle. Accordingly, the delivery table is not fixed but is mounted so that it can be swung bodily with respect to the rolls 15 to compensate for different bias angles. Such movement is indicated by the arcuate arrows in Figure 1.

The rolls 15, which have been referred to thus far as a unit, comprise a plain, smooth-surfaced roll 26 which acts in conjunction with a resilient roll 27 which preferably takes the form of a rotary brush. The use of a brush minimizes the possibility of damaging the fabric ply sections by permitting the fabric to slip between the rolls whenever the forces exerted on the fabric become too great. Of course, two smooth rolls can be used as an alternative construction or a pair of resilient rubber covered rolls can be used. In some cases a curved guiding surface in conjunction with a single driving roll might be used.

In the present illustration, the smooth roll 26 and the rotary brush 27 are positively geared together by two identical gears 28 and 29 secured upon the shafts 30 and 31, respectively, of the rolls 26 and 27 with the gear 29 being driven directly by an electrical motor 32.

In some cases it might be desirable to have a second conveyor 34 disposed adjacent the rolls to receive the ply sections from the rolls and carry them in the direction of conveyor 22. In any case, a pivotal guide 36, shown in Figure 2, is provided to guide the ply sections onto the conveyor or conveyors. Such a guide takes the form of a flat, rectangular plate pivoted at 37 which in one position, as shown by the full lines of Figure 2, directs the sections onto conveyor 22, and in its other position, shown in dotted lines, guides the sections onto conveyor 34. The stops indicated at 38 and 39 determine these two positions, the guide plate being turned manually from one position to the other.

While a preferred form of the invention has been shown, various modifications will occur to those skilled in the art without departing from the spirit and scope of the present invention, the important features of which are summarized in the appended claims.

What is claimed is:

1. Apparatus for turning and aligning the trapezoidal sections of tire ply fabric stock, after the sections have been produced by bias-cutting continuous lengths of the rubberized fabric, comprising a conveyor adapted to move said sections forwardly in a direction parallel to the cords of said fabric, a pair of rolls adapted to receive said sections from said first conveyor and to deposit said sections on a second conveyor, said rolls being aligned at an acute angle to said first conveyor with their axes substantially perpendicular to the leading and trailing edges of said trapezoidal sections as they lie on said first conveyor and with their axes extending across said second conveyor at right angles thereto whereby said leading and trailing edges of said sections become the side edges of said sections when they are deposited and carried forward on said second conveyor.

2. Apparatus according to claim 1 in which said rolls comprise a smooth-surfaced first roll and a second roll having a yielding surface.

3. Apparatus according to claim 2 in which said second roll comprises a rotary brush.

4. Apparatus according to claim 2 in which said second roll has a rubber-covered surface.

5. Apparatus according to claim 1 in which the peripheral speed of said rolls is substantially greater by about 20% than the speed of said first conveyor.

6. Apparatus according to claim 5 in which the speed of said second conveyor is slightly greater by about 2% than the peripheral speed of said rolls.

7. Apparatus for turning and aligning trapezoidal sections of tire ply fabric stock, after the sections have been produced by bias-cutting continuous lengths of the rubberized fabric, said apparatus comprising a first conveyor adapted to move said sections forwardly in a direction parallel to the cords of said fabric, a second conveyor disposed at an acute angle with respect to said first conveyor, means to grip said sections and the pull them from said first conveyor in a direction parallel to the leading and trailing edges of said sections as they lise on said first conveyor and to release said sections onto said second conveyor with said leading and trailing edges forming the parallel side edges of said sections when they are disposed on said second conveyor.

8. Apparatus for turning and aligning trapezoidal sections of tire ply fabric stock after the sections have been produced by bias-cutting continuous lengths of the rubberized fabric, comprising a first conveyor adapted to move said sections forwardly in a direction parallel to the cords of said fabric, means including a driven roll adapted to receive said sections from said first conveyor and to deposit said sections on a second conveyor, said roll being aligned with its axis at an acute angle with respect to said first conveyor and substantially perpendicular to the leading and trailing edges of said trapezoidal sections as they lie on said first conveyor and with its axis extending at substantially right angles to said second conveyor whereby said leading and trailing edges form the parallel side edges of said sections when they are deposited on said second conveyor.

9. Apparatus for turning and aligning the trapezoidal sections of tire ply fabric stock, after the sections have been produced by bias-cutting continuous lengths of the rubberized fabric, comprising a first conveyor adapted to move said sections forwardly in a direction parallel to the cords of said fabric, a second conveyor, a pair of rolls adapted to receive said sections from said first conveyor and to deposit said sections on said second conveyor, the axes of said rolls being disposed at an angle to said first conveyor substantially equal to the bias angle of said fabric cords and the axes of said rolls extending at substantially right angles to said second conveyor.

10. Apparatus according to claim 9 in which said second conveyor is positioned below said first conveyor and said rolls are positioned between said conveyors.

11. Apparatus according to claim 9 in which said first conveyor can be bodily pivoted with respect to said rolls and second conveyor whereby to adjust the apparatus to accommodate different bias angles of the ply fabric stock.

12. Apparatus according to claim 9 and a third conveyor aligned with said second conveyor and moving in an opposite direction to said second conveyor and a guide adapted to guide said sections from said rolls onto either said second or said third conveyor.

13. Apparatus according to claim 12 in which said guide comprises a pivoted plate adapted to be swung toward either of said rolls.

14. The method of turning flat trapezoidal sections of bias-cut rubberized tire ply fabric into position for splicing into a continuous length, which comprises moving said trapezoidal sections forwardly in the direction of the cords of said fabric, engaging the sections transversely to the cut edges and positively driving them in a direction parallel to said cut edges, whereby to align successive sections with the uncut edges of each section adjacent and parallel to the uncut edges of adjoining sections and with the cut edges of said sections forming the parallel side edges of said continuous length.

References Cited in the file of this patent
UNITED STATES PATENTS

| | | |
|---|---|---|
| 1,640,108 | Broadmeyer | Aug. 23, 1927 |
| 1,771,964 | Mentges | July 29, 1930 |
| 1,939,360 | Nelson | Dec. 12, 1933 |
| 1,987,339 | Hitchcock | Jan. 8, 1935 |